H. O. SHOCKLEY.
RESILIENT WHEEL.
APPLICATION FILED JULY 13, 1912.
1,050,859.
Patented Jan. 21, 1913.
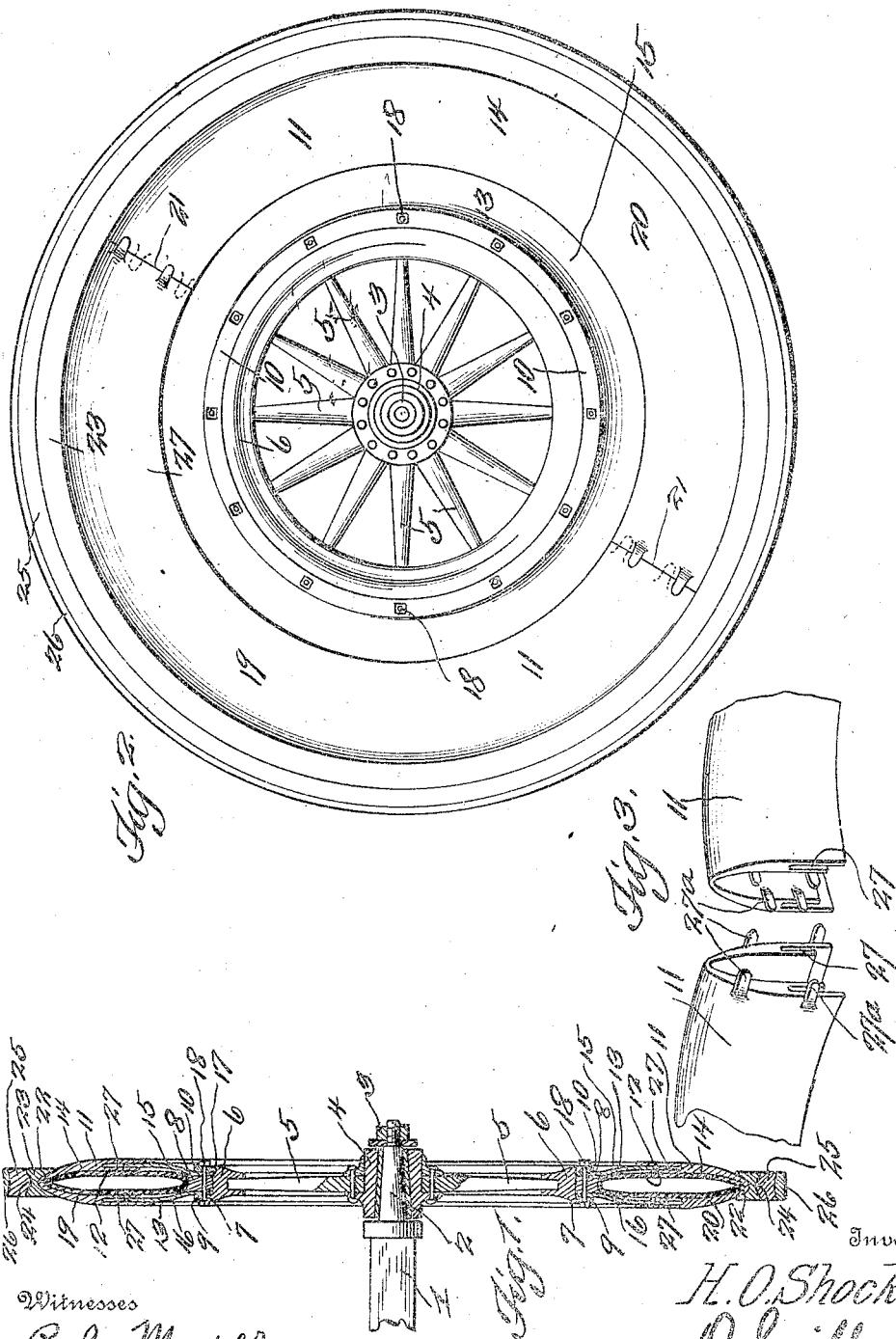
Witnesses
Inventor
H. O. Shockley

UNITED STATES PATENT OFFICE.

HARLOW ORVILLE SHOCKLEY, OF DARLINGTON, WISCONSIN.

RESILIENT WHEEL.

1,050,859.  Specification of Letters Patent.  Patented Jan. 21, 1913.

Application filed July 13, 1912. Serial No. 709,141.

*To all whom it may concern:*

Be it known that I, HARLOW O. SHOCKLEY, a citizen of the United States, residing at Darlington, in the county of Lafayette and State of Wisconsin, have invented a new and useful Resilient Wheel; and I do hereby declare the following to be a full, clear, and exact description of the invention, such as will enable others skilled in the art to which it appertains to make and use the same.

This invention relates to a new and useful vehicle wheel.

As one of the objects of the invention, it is the aim to provide a wheel of this design, in which the pneumatic is disposed adjacent the hub of the wheel, so as to eliminate the possibility of the same becoming punctured.

As a further object of the invention, a metallic casing is provided entirely inclosing the pneumatic for shielding and protecting the same.

Another object is to construct this casing of an inner and outer section having a slide joint, whereby the inner section may move relative to the outer section.

A further object of the invention is to construct the wheel in such wise as to permit the pneumatic to be readily removed.

The invention comprises further features and combination of parts, as hereinafter set forth, disclosed in the drawings and claimed.

In the drawings:—Figure 1 is a vertical sectional view through a wheel constructed in accordance with the invention. Fig. 2 is a view in side elevation. Fig. 3 is a detail view.

Referring more particularly to the drawings 1 designates the usual axle, and 2 the spindle thereof while 3 denotes a nut (which is threaded to a reduced extension of the spindle) for holding the hub 4 of the wheel on the spindle. The hub 4 is provided with the usual spokes 5, which connect to the rim 6. Projecting from the outer circumference of the rim on one side thereof, and forming an integral part of the rim 6 is a flange 7. Also projecting from the rim is a central flange 8, between which and the flange 7 a space 9 is formed. The flange 8 is removable. Surrounding the rim 6 is an annular ring 10, the purpose of which will be hereinafter disclosed.

A metallic casing 11 is provided for inclosing and protecting the pneumatic 12. This metallic casing 11 comprises the inner and outer sections 13 and 14. The inner section, however, is composed of the annular plates 15 and 16, which are provided with openings 17, through which the rim 6 extends. The plate 16 is arranged in the space 9, while the plate 15 is disposed between the flange 8 and the annular ring 10, there being a series of bolts passing through the flanges 7 and 8, the plates 15 and 16 and the annular ring 10, and provided with nuts 17, thereby holding the parts secure. The bolts are denoted by the numerals 18.

The outer section of the casing 11 is constructed in two parts 19 and 20, as shown in Fig. 3, which meet at 21. This outer section 14 arches over the pneumatic, and the arched portion 22 seats in a groove in the rim 23, the outer face of which is constructed with a groove 24, to receive the felly 25, to which the tire or rim 26 is secured. The section 14 is provided with U-shaped guides 27, between which the plates 15 and 16 are guided, as the hub and rim 6 together with the plates 15 and 16 move relative to the outer section 14.

The outer section 14 of the casing 11 is constructed in two halves or parts, the adjacent ends of which halves or sections are provided with overlapping tabs 27$^a$, upon the inner and outer surface of the halves, so as to prevent displacement of the halves or parts.

The plates 15 and 16 are constructed of resilient sheet metal, so as to yield or bow outwardly, when the air in the pneumatic 12 is under compression. The section 14 of the casing 11 is also constructed of resilient sheet metal, so that the opposite sides of said section 14 will yield or bow outwardly, when the air in the pneumatic 12 is under compression.

In the drawings there has been disclosed a certain structure, but in practical fields this structure may necessitate alterations, to which the patentee is entitled, provided the alterations are comprehended within the scope of what is claimed.

From the foregoing it will be discerned there has been produced a novel form of vehicle wheel having a metallic casing, the arch of which seats in a groove of the felly or rim of the wheel, and one in which other desirable features, such as the slidable joint of a metallic casing, and means for permitting the removal of the pneumatic, are included.

The invention having been set forth, what is claimed as new and useful is:—

1. In a vehicle wheel, a hub member including a hub rim, a pneumatic cushion, an outer wheel rim, a casing inclosing said pneumatic cushion and interposed between said rims, said casing being constructed of resilient sheet metal and comprising inner and outer sections, the outer section being constructed in two halves, the adjacent ends of which are provided with means to prevent displacement of said halves relative to one another, said outer section having sliding connections with the inner section.

2. In a vehicle wheel, a hub member including a hub rim, a pneumatic cushion, an outer wheel rim, a casing inclosing said pneumatic cushion and interposed between said rims, said casing being constructed of resilient sheet metal and comprising inner and outer sections, the outer section being constructed in two halves, the adjacent ends of which halves are provided with overlapping tabs, upon the inner and outer faces of said outer sections, so as to prevent displacement of said halves relative to one another, said outer section being provided with sliding connections with the inner section.

In testimony whereof I have signed my name to this specification in the presence of two subscribing witnesses.

HARLOW ORVILLE SHOCKLEY.

Witnesses:
J. K. CAREY,
W. H. LAW.